United States Patent [19]

Torrence et al.

[11] 3,813,047

[45] May 28, 1974

[54] SPIDER BEARING ASSEMBLY FOR GYRATORY CRUSHERS

[75] Inventors: James D. Torrence; Fred L. Graves, both of Appleton, Wis.

[73] Assignee: Allis-Chalmers Corporation, Milwaukee, Wis.

[22] Filed: Dec. 7, 1972

[21] Appl. No.: 312,841

[52] U.S. Cl.................... 241/211, 241/213, 241/215
[51] Int. Cl................................................ B02c 2/04
[58] Field of Search............................ 241/207–216

[56] References Cited
UNITED STATES PATENTS

| | | | |
|---|---|---|---|
| 1,005,358 | 10/1911 | Symons | 241/214 X |
| 1,528,741 | 3/1925 | Weston | 241/212 |
| R24,754 | 12/1959 | Becker | 241/216 UX |
| 2,977,057 | 3/1961 | Beyhl | 241/215 X |
| 3,190,569 | 6/1965 | Polzin | 241/211 |
| 3,456,889 | 7/1969 | Burkhardt et al. | 241/213 |

*Primary Examiner*—Granville Y. Custer, Jr.
*Assistant Examiner*—Howard N. Goldberg
*Attorney, Agent, or Firm*—Arthur M. Streich

[57] ABSTRACT

A spider bearing assembly for a gyratory crusher is disclosed in which a flanged bushing has a bearing sleeve projecting downwardly between the top of a gyrating shaft and a spider hub, and the sleeve has a lower edge below a fulcrum point within the hub about which the shaft gyrates. A lubricant seal is arranged between the shaft and the hub, which cooperates with the sleeve edge to define an annular lubricant collecting groove around the shaft. The bushing defines one or more lubricant pressure relief passages from the annular groove to the top of the bushing. A source of lubricant is connected to a reservoir defined by the upper end of the shaft, the top of the bushing, and an inner periphery of the hub to supply lubricant to a level above the bushing. A generally vertical vent tube is connected to each pressure relief passage and projects upwardly above the reservoir lubricant level to vent lubricant pressure in the annular groove to atmosphere above the reservoir lubricant level, to relieve lubricant pressure on the seal that builds up as a result of pumping action of the crusher shaft gyrating in the bushing. The distance that the lower edge of the bushing sleeve is below the fulcrum point, is preferably substantially less than the distance between the top of the shaft and the fulcrum point, to minimize lubricant pressure acting downwardly on the seal and a pair of relatively small diameter relief passages will usually be sufficient to vent pressure from the annular lubricant collecting groove.

7 Claims, 4 Drawing Figures

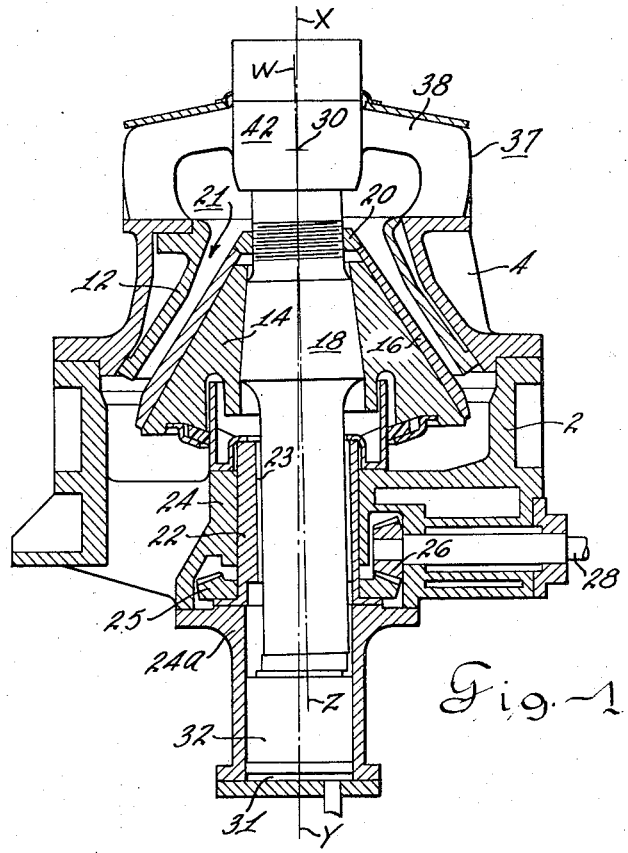
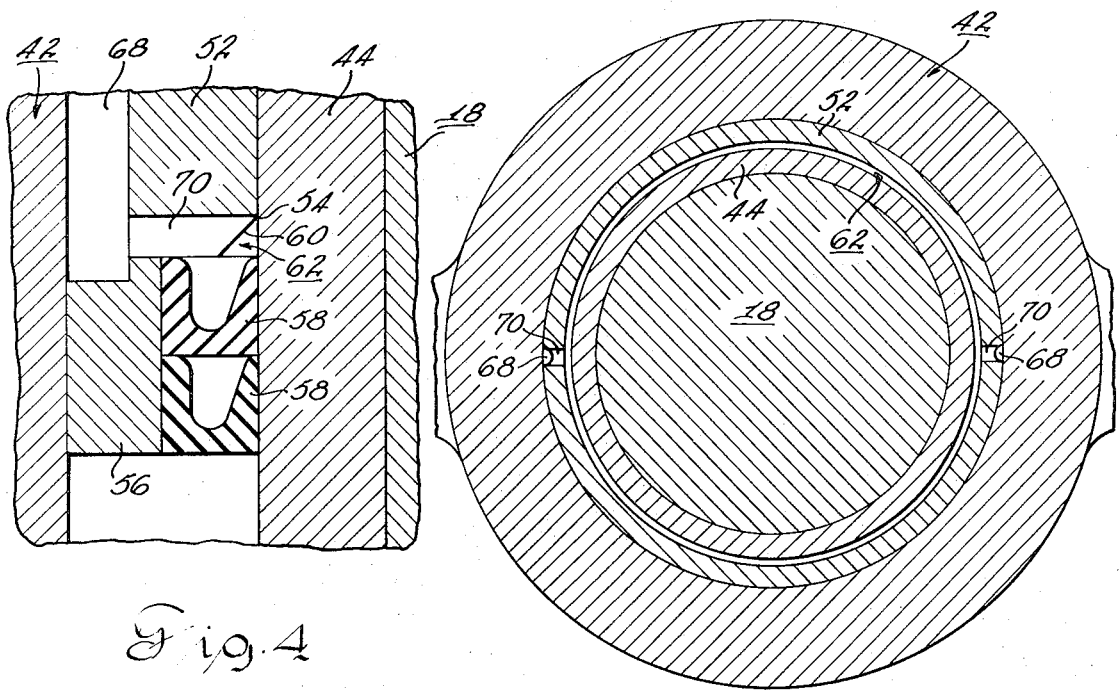

SPIDER BEARING ASSEMBLY FOR GYRATORY CRUSHERS

BACKGROUND OF THE INVENTION

1. Field of the Invention

This invention relates to gyratory crushers and more particularly to an improved spider bearing for the main shaft of the crusher and lubrication therefor.

2. Description of the Prior Art

In gyratory crushers of the prior art, of the type having a spider with a hub bearing support in which the crusher head is vertically adjustable, the usual manner of supporting the upper portion of the main shaft of the crusher is to mount a bearing sleeve around the upper portion of the crusher shaft, with the shaft being vertically slidable and gyratable in the bearing sleeve relative to a fulcrum point on a central axis within the hub, and with the bearing sleeve in turn being supported by the spider hub. The spider is supported by or forms part of the stationary frame or shell structure. An early example of such a crusher is shown in U.S. Pat. No. 867,557 of 1907. When it was found desirable to provide lubrication between the gyrating shaft and the sleeve bearing a seal was provided at the lower end of the sleeve bearing as shown in U.S. Pat. No. 1,641,715 of 1927.

In the prior art constructions, various problems occur which it is an object of the present invention to overcome. For example, in the prior art constructions, the seal at the lower end of the bearing sleeve failed to retain lubricating oil because the gyrating motion of the shaft acted as a pump which exerted a pressure on the oil which at least in part was directed downwardly on the seal and the seal leaked oil into the crushing chamber. In addition to the undesirable loss of lubricating oil, leakage of oil created certain process problems, as for example when mineral ore is crushed for concentration. The presence of oil in the crushed rock was found to adversely affect concentration.

The oil leakage problem encountered in the prior art spider bearing assemblies has made it impractical to use oil as a lubricant for the spider bearing, which would permit the use of the more advantageous force feed or circulating lubrication systems, but has instead required the use of grease lubricant in the spider bearing cavity. The use of grease as a lubricant is less satisfactory than a forced feed oil lubrication system since the use of grease requires frequent inspection by crushing plant personnel. Furthermore, grease only provides borderline lubrication of the bearing. This is because the gyratory motion of the crusher shaft requires a grease with a rapid slump or relatively low viscosity to enter the bearing clearance. Operators frequently use a grease of questionable viscosity which results in poor lubrication.

The present invention provides an improved solution to the aforesaid problems and without requiring a spider hub to be cast with a central spindle as shown in U.S. Pat. No. 3,456,889 of 1969 and of which one of the present inventors was a co-inventor.

SUMMARY OF THE INVENTION

Accordingly, it is an object of the present invention to provide an improved spider bearing construction for gyratory crushers which eliminates the problems encountered in prior art spider bearing constructions, such as the leakage of oil and the disadvantages of grease.

It is another object of the invention to provide a spider bearing assembly for gyratory crushers which is adapted for static or forced feed circulating oil lubrication instead of the grease lubrication generally used in prior art spider bearing assemblies, and in which leakage of lubricant from the spider bearing assembly is eliminated.

It is another object of the invention to provide a spider bearing assembly for gyratory crushers which permits a lowering of the fulcrum point on the crusher, permitting reduction in crusher height.

In achievement of these objectives, there is provided in accordance with a preferred embodiment of the invention, a spider bearing assembly in which the shaft has a lower end portion journaled in an eccentric sleeve carried by frame structure and an upper end portion projecting upwardly into a spider hub. Driving means rotate the eccentric sleeve about a vertical axis central of the spider hub and the machine's crushing chamber, to impart a gyratory motion to the shaft about a fulcrum point which is located on the vertical central axis and within the hub. The bearing assembly includes a flanged bushing that has a bearing sleeve projecting downwardly between the gyrating shaft and the spider hub, and the sleeve has a lower edge below the fulcrum point within the hub about which the shaft gyrates. A lubricant seal is arranged between the shaft and the hub, which cooperates with the sleeve edge to define an annular lubricant collecting groove around the shaft. The bushing defines one or more lubricant pressure relief passages from the annular groove to the top of the bushing. A source of lubricant is connected to a reservoir defined by the upper end of the shaft, the top of the bushing, and an inner periphery of the hub to supply lubricant to a level above the bushing. A generally vertical vent tube is connected to each pressure relief passage and projects upwardly above the reservoir lubricant level to vent lubricant pressure in the annular groove to atmosphere above the reservoir lubricant level, to relieve lubricant pressure on the seal that builds up as a result of pumping action of the crusher shaft gyrating in the bushing or the raising of the shaft, and to relieve a partial vacuum resulting from lowering the shaft. The distance that the lower edge of the bushing sleeve is below the fulcrum point, is preferably substantially less than the distance between the top of the shaft and the fulcrum point, to minimize lubricant pressure acting downwardly on the seal as a result of the pumping action by the portion of the shaft gyrating within the bushing below the fulcrum.

Further objects and advantages of the invention will become apparent from the following description taken in conjunction with the accompanying drawing in which:

BRIEF DESCRIPTION OF THE DRAWINGS

FIG. 1 is a perspective view partly in vertical section, showing a gyratory crusher embodying the improved spider bearing assembly of the present invention;

FIG. 3 is a view in section along line III—III of FIG. 2; and

FIG. 4 is an enlarged fragmentary view of a portion of the structures shown in FIG. 2.

DESCRIPTION OF THE PREFERRED EMBODIMENT

Figure 2:
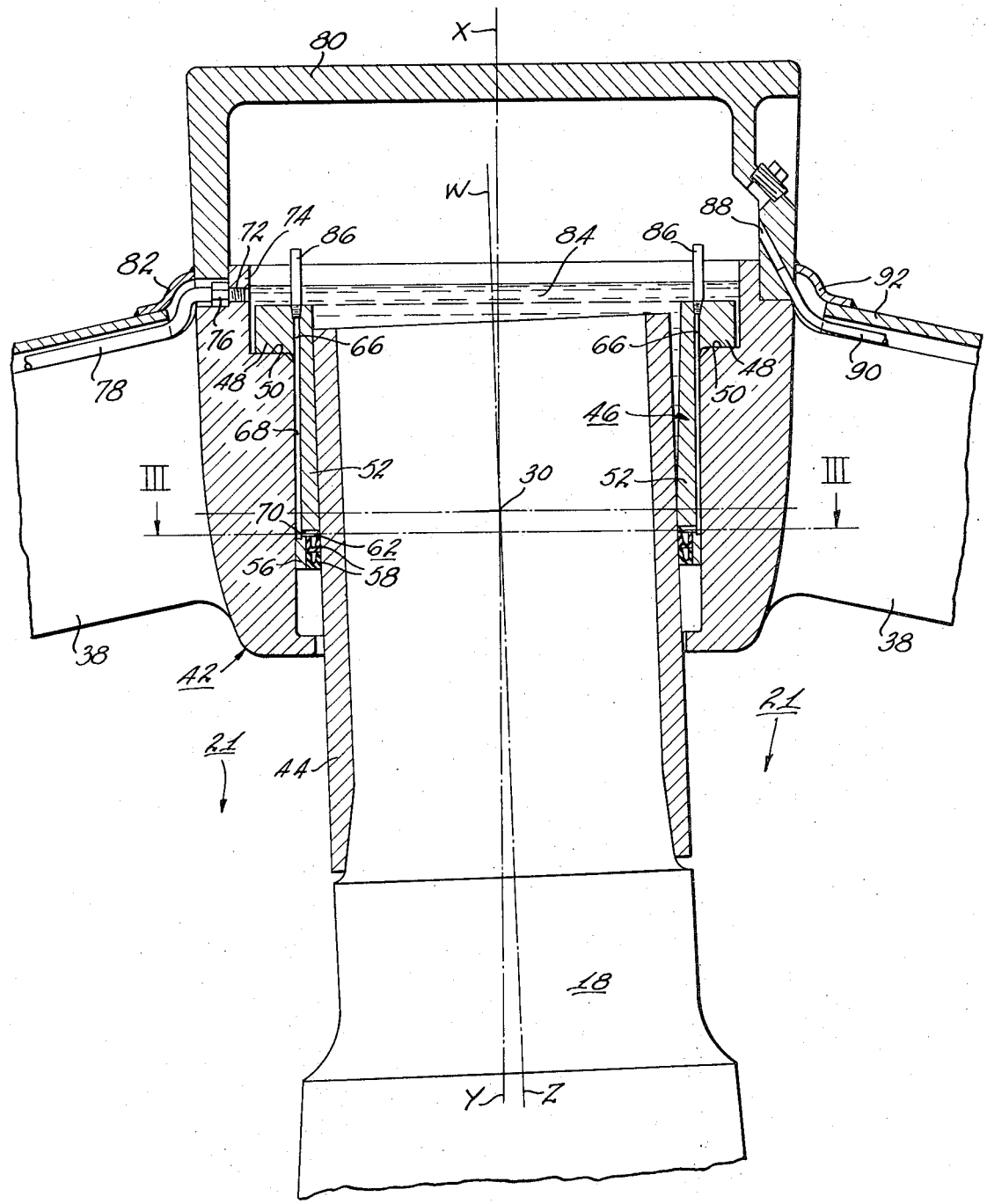
FIG. 2 is an enlarged fragmentary view partly in section, showing the spider bearing assembly in greater detail.

Referring now to FIG. 1 of the drawing, there is shown a gyratory crusher of the general type as shown in the aforementioned U.S. Pat. No. 3,456,889, comprising a lower frame section 2 and an upper frame section 4. A bowl liner or concave 12 is supported within the upwardly open upper frame section 4. A crusher head 14 is mounted on shaft 18 and a crusher mantle 16 is secured on shaft 18 and on crusher head 14 by a head nut 20. A crushing chamber 21 is defined between bowl liner 12 and crusher mantle 16. The lower portion of shaft 18 is journaled within the eccentric vertical bore of an eccentric 22 by means of a bearing sleeve or liner 23 positioned within the eccentric bore.

Eccentric 22 is cylindrical and is supported for rotation by pedestal-like inner frame portion 24 and base portion 24a. Eccentric 22 is rotated by the engagement of ring gear 25 on the eccentric 22 with a mating pinion gear 26 mounted on a drive shaft 28. Rotation of eccentric 22 by gears 25, 26 imparts a gyratory movement to crusher head 14, as is well known in the art, about a fulcrum 30 on a vertical axis X-Y central of crushing chamber 21 and hub 42.

Shaft 18 and crusher head 14 may be vertically adjusted by any suitable means such as by admission of hydraulic fluid or the like into the space 31 beneath the lower end of piston 32 which supports the lower end of shaft 18, to provide any necessary adjustment of the clearance between the crusher head 14 and bowl liner 12.

A spider assembly generally indicated at 37 is mounted at the upper end of upper frame section 4 of the crusher. Spider assembly 37 includes a radially inwardly extending arm or arms indicated at 38 which support a centrally located hub 42.

Hub 42 and the bearing assembly supported thereby, will be described with reference to FIGS. 2, 3 and 4, and in particular to begin with, FIG. 2. As shown in FIG. 2, the fulcrum point 30 is within hub 42. The fulcrum point 30 is on the axis X-Y, which is the central axis of hub 42 and crushing chamber 21, at a location within hub 42 where an axis W-Z central to shaft 18, intersects with the axis X-Y.

Shaft 18 is fitted with a replaceable wear sleeve 44. The bearing assembly for shaft 18 and wear sleeve 44 includes a bushing 46 having a radial flange 48 which is seated upon a generally horizontal shoulder 50 of hub 42. A bearing sleeve 52 projects downwardly from the flange 48 and between wear sleeve 44 and hub 42 (see also FIGS. 3 and 4). The outer periphery of bearing sleeve 52 is cylindrical. The space enclosed by the inner periphery of bearing sleeve 52 is somewhat hourglass in shape. That is, (see FIG. 2) the diameter of the space within sleeve 52 is a minimum in a transverse plane normal to the fulcrum point 30, and the diameter becomes progressively slightly larger in both axial directions from fulcrum 30. This permits the gyratory action of shaft 18 with sleeve 52 and results in wear sleeve 44 making contact above fulcrum 30 with sleeve 52 on one side thereof (i.e., the left side as shown in FIG. 2) while a gap is opened between sleeve 44 and sleeve 52 on the other side thereof (i.e., the right hand side as shown in FIG. 2). As shaft 18 gyrates the gap moves around the outer circumference of wear sleeve 44 and the inner circumference of bearing sleeve 52, admitting lubricating oil thereto as will further appear from description to follow later.

As may better be seen with regard to FIG. 4, the bearing sleeve 52 has a lower edge 54 adjacent the wear sleeve 44 of shaft 18, and a collar portion 56 projecting downwardly from the edge 54. However, whereas the edge 54 of bearing sleeve 52 is in very close proximity to wear sleeve 44, the inner circumference of the collar portion 56 is spaced from wear sleeve 44 a sufficient distance to accommodate a pair of lip type sealing rings 58. The edge 54 is undercut, radially outward, to define an annular surface 60 which cooperates with the uppermost of the sealing rings 58 to define an annular lubricant collecting groove 62 (see also the groove 62 in FIG. 3).

A pair of lubricant pressure relief passages are provided, which may be identical, and one of the passages will now be described. Referring to FIG. 2, a vertical hole 66 is drilled through the radial flange 48 of bushing 46. A vertical slot 68 is machined in the outer periphery of bearing sleeve 52 from the lower terminus of hole 66 to a level as best shown in FIG. 4, a short distance below the level of the annular lubricant collecting groove 62. With bearing sleeve 52 being positioned as shown in FIG. 2, the inner periphery of hub 42 cooperates with slot 68 to define a vertical passage from the bottom of hole 66 to the level below groove 62. A hole 70 (see FIGS. 3 and 4) is drilled radially inward from slot 68 to groove 62 thus providing a continuous passage from the top of flange 48 to groove 62.

Referring once again to FIG. 1, a horizontal threaded hole 72 is provided through an upper portion 74 of hub 42, to open radially inward above the radial flange 48 of bushing 46. Lubricant supply means are provided including nipple 76 threaded into hole 72 and a lubricant supply tube 78 connected to a source of pressurized lubricant (not shown) and to the nipple 76. A cap 80 is mounted on top of hub 42 which along with a shield 82 protects tube 78 from stone dropping downwardly over cap 80 into crushing chamber 21. The upper portion 74 of hub 42 along with the flange 48 of bushing 46 and the top of shaft 18, define a lubricant reservoir 84. The flow of pressurized lubricant through nipple 76 may be maintained to establish a lubricant level in reservoir 84 above flange 48. A vertical vent tube 86 may be threaded into each of the holes 66 to project upwardly above the lubricant level in reservoir 84 to vent lubricant pressure in the annular groove 62 through (see FIGS. 3 and 4) holes 70, slots 68, (then referring to FIG. 2) through holes 66 and tubes 86 to atmosphere above the reservoir lubricant level and within cap 80. The atmosphere within cap 80 is in turn vented to the exterior of the machine by a hole 88 in cap 80 and a tube 90 protected by a shield 92.

In the operation of the gyratory crusher having the improved spider bearing assembly, the crusher head may be adjusted vertically for any of the usual reasons such as adjustment of the clearance between the bowl liner 12 and the crusher mantle 16, or for tramp metal relief or packing relief. In any adjusted position of the shaft and crusher head, sleeve bearing 52 within hub 42, establishes the fulcrum point 30 for the gyrating shaft 18. Lubricating oil may be force fed from a suitable supply source by a pump (not shown), the oil passing through (as shown in FIG. 2) tube 78 and nipple 76 discharges into the reservoir 84. As drive shaft 28 rotates the eccentric sleeve 22 and shaft 18 gyrates about fulcrum 30, the gap (shown in FIG. 2 on the right hand side of the wear sleeve 44) between the wear sleeve 44 and the sleeve bearing 52, moves around wear sleeve 44 permitting lubricant to flow downwardly around the entire outer periphery of wear sleeve 44 and the inner periphery of bearing sleeve 52. The pumping action of the gyrating shaft 18 and wear sleeve 44 within bearing sleeve 52, that takes place above the fulcrum point 30, tends to pump lubricant back up into reservoir 84 from whence it flows back down thus providing proper lubrication at least above the level of fulcrum 30. The shorter length of contact between bearing sleeve 52 and wear sleeve 44 below the level of fulcrum 30, imparts less pressure to the lubricant than is imparted to lubricant above the fulcrum 30, but the pressure that is developed below fulcrum 30 tends to be directed downwardly and must be resisted by the seals 58. This tendency is relieved by such pressurized lubricant being collected in annular groove 62 and vented through holes 70, slots 68, holes 66 and tubes 86, to the space within cap 80. From cap 80 any such pressure, as well as any pressure buildup resulting from piston 32 raising shaft 18, is vented out of cap 80 through hole 88 and tube 90. Thus is achieved improved lubrication between wear sleeve 44 and bearing sleeve 52, sealing of the space between collar 56 and wear sleeve 44 by the seals 58, and oil rather than grease may advantageously be used. The objects set forth for the present invention have therefore been achieved.

From the foregoing detailed description of the present invention it has been shown how the objects of the present invention have been attained in a preferred manner. However, modification and equivalents of the disclosed concepts such as readily occur to those skilled in the art are intended to be included in the scope of this invention. Thus, the scope of the invention is intended to be limited only by the scope of the claims such as are or may hereafter be, appended hereto.

The embodiments of the invention in which an exclusive property or privilege is claimed are defined as follows:

1. A gyratory crusher having a frame, an outer concave crushing member supported by said frame, a spider with a central hub mounted on top of the frame and above the concave, a shaft having a lower end portion journaled in an eccentric sleeve carried by the frame and an upper end portion projecting upwardly into the spider hub, an inner crushing member mounted on said shaft, means driving said eccentric sleeve to rotate about a vertical axis central of the concave to impart a gyratory motion to said shaft and to said inner crushing member about a fulcrum point which is located on the vertical central axis and within the hub, and a bearing assembly between the upper shaft portion and the hub, the bearing assembly comprising:
  a. a bushing having a radial flange engaging an upper generally horizontal surface of the hub, a bearing sleeve with a cylindrical outer periphery projecting downward from the flange and between the outer periphery of the shaft and the inner periphery of the hub, and having a lower edge of the cylindrical sleeve adjacent the shaft being below the fulcrum point;
  b. lubricant sealing means between the shaft and the hub, with the lubricant sealing means and the lower edge of the cylindrical sleeve cooperating to define an annular lubricant collecting groove around the shaft;
  c. with the bushing having a lubricant pressure relief passage extending from the annular groove to a top surface of the bushing;
  d. lubricant supply means connected to the hub operable to supply lubricant to a reservoir defined by the upper end of the shaft, the top surface of the bushing flange and the inner periphery of the hub, and further operable to supply the lubricant to a reservoir level above the bushing flange; nd
  e. a generally vertical vent tube supported within the hub and connected to the pressure relief passage to project upwardly above the reservoir lubricant level to vent lubricant pressure in the annular groove to atmosphere above the reservoir lubricant level.

2. A gyratory crusher according to claim 1 in which the distance that the said lower edge of the cylindrical sleeve of the bushing is below the fulcrum point, is less than the distance between the top of the shaft and the fulcrum point, to thereby minimize lubricant pumping and pressurizing action by the portion of the shaft gyrating within the bushing below the fulcrum point.

3. A gyratory crusher according to claim 1 in which the annular groove is defined by an annular and downwardly open slot in the sleeve facing the lubricant sealing means.

4. A gyratory crusher according to claim 1 in which the annular groove is vented by a pair of said pressure relief passages, on opposite sides of the upper portion of the shaft, and each having a vent tube projecting upwardly above the reservoir lubricant level.

5. A gyratory crusher according to claim 1 in which the cylindrical sleeve of the bushing has a roller projecting downwardly of the sleeve below the annular groove and below the relief passage, with the collar having an inner periphery engaging the sealing means and an outer periphery engaging the hub.

6. A gyratory crusher according to claim 1 having a spider cap forming a roof over the lubricant reservoir, and a vent opening defined in the cap communicating with a space within the cap and above the reservoir, at a level above the vent tube.

7. A gyratory crusher according to claim 1 in which the pressure relief passage defined by the bushing comprises a vertical hole through the radial flange of the bushing, the vertical hole being aligned with a vertical slot in the outer periphery of the bearing sleeve, and a radial and generally horizontal hole through the bearing sleeve from the slot to the annular lubricant collecting groove.

* * * * *

PO-1050
(5/69)

UNITED STATES PATENT OFFICE
CERTIFICATE OF CORRECTION

Patent No. 3,813,047      Dated May 28, 1974

Inventor(s) James D. Torrence and Fred L. Graves

It is certified that error appears in the above-identified patent and that said Letters Patent are hereby corrected as shown below:

Column 6, Claim 1, line 19, "nd" should be --- and ---;

Claim 5, line 43, "roller" should be --- collar ---.

Signed and sealed this 24th day of September 1974.

(SEAL)
Attest:

McCOY M. GIBSON JR.
Attesting Officer

C. MARSHALL DANN
Commissioner of Patents